(12) United States Patent
Zhao et al.

(10) Patent No.: US 10,847,783 B2
(45) Date of Patent: Nov. 24, 2020

(54) SULFUR-BASED TRANSITION METAL COMPOSITE AND THE NEGATIVE ELECTRODE COMPRISING THE SAME AND THE BATTERY COMPRISING THE SAME

(71) Applicant: Xiamen University, Fujian (CN)

(72) Inventors: JinBao Zhao, Fujian (CN); Bo Liu, Fujian (CN); XuXiang Wang, Fujian (CN)

(73) Assignee: XIAMEN UNIVERSITY (CN)

( * ) Notice: Subject to any disclaimer, the term of this patent is extended or adjusted under 35 U.S.C. 154(b) by 391 days.

(21) Appl. No.: 15/121,249

(22) PCT Filed: Apr. 21, 2014

(86) PCT No.: PCT/CN2014/075762
§ 371 (c)(1),
(2) Date: Aug. 24, 2016

(87) PCT Pub. No.: WO2015/161400
PCT Pub. Date: Oct. 29, 2015

(65) Prior Publication Data
US 2017/0125794 A1    May 4, 2017

(51) Int. Cl.
*H01M 4/136*    (2010.01)
*H01M 4/66*    (2006.01)
*H01M 4/36*    (2006.01)
*H01M 4/58*    (2010.01)
*H01M 4/02*    (2006.01)

(52) U.S. Cl.
CPC ........... *H01M 4/136* (2013.01); *H01M 4/364* (2013.01); *H01M 4/58* (2013.01); *H01M 4/5815* (2013.01); *H01M 4/661* (2013.01); *H01M 2004/027* (2013.01)

(58) Field of Classification Search
CPC ........ H01M 4/136; H01M 4/364; H01M 4/58; H01M 4/5815; H01M 4/661
USPC ........................................................ 429/341
See application file for complete search history.

(56) References Cited

U.S. PATENT DOCUMENTS

| 4,670,363 A | * | 6/1987 | Whitney | ........... H01M 10/0569 |
| | | | | 429/199 |
| H001334 H | * | 7/1994 | Plichta | .......................... 429/103 |
| 5,814,420 A | * | 9/1998 | Chu | ...................... C07C 227/32 |
| | | | | 136/238 |

(Continued)

FOREIGN PATENT DOCUMENTS

| CN | 102969501 | 3/2013 |
| CN | 103035914 | 4/2013 |

(Continued)

*Primary Examiner* — Jayne L Mershon
(74) *Attorney, Agent, or Firm* — Dickinson Wright, PLLC

(57) ABSTRACT

The present invention provides a type of cost-effective sulfur-based transition metal composite as the negative electrode active material for lithium ion batteries with high capacity. Moreover, a non-aqueous secondary battery using this negative electrode with long cycle life and high capacity is provided. The battery contains a positive electrode, negative electrode, separator, and non-aqueous electrolytes. The negative electrode contains at least one kind of sulfur-based transition metal composites provided in the present invention.

13 Claims, 5 Drawing Sheets

(56) References Cited

U.S. PATENT DOCUMENTS

| | | | | |
|---|---|---|---|---|
| 6,207,327 | B1* | 3/2001 | Takada | H01B 1/10 |
| | | | | 429/221 |
| 2005/0175903 | A1* | 8/2005 | Kim | H01M 4/02 |
| | | | | 429/246 |
| 2006/0199078 | A1* | 9/2006 | Koshina | H01M 4/131 |
| | | | | 429/231.95 |
| 2012/0107683 | A1* | 5/2012 | Kim | H01M 4/0404 |
| | | | | 429/211 |
| 2013/0065128 | A1* | 3/2013 | Li | H01M 10/0525 |
| | | | | 429/218.1 |
| 2013/0157114 | A1* | 6/2013 | Barchasz | H01M 4/483 |
| | | | | 429/160 |
| 2014/0110639 | A1* | 4/2014 | Yamamura | H01M 4/0471 |
| | | | | 252/519.1 |
| 2014/0272558 | A1* | 9/2014 | Xiao | H01M 10/28 |
| | | | | 429/211 |
| 2014/0308576 | A1* | 10/2014 | Gaben | C25D 13/02 |
| | | | | 429/185 |
| 2014/0370381 | A1* | 12/2014 | Mengqun | H01M 2/1653 |
| | | | | 429/217 |
| 2015/0132652 | A1* | 5/2015 | Ito | C01G 45/006 |
| | | | | 429/223 |
| 2015/0280220 | A1* | 10/2015 | Ikeda | H01M 4/136 |
| | | | | 429/342 |

FOREIGN PATENT DOCUMENTS

| | | | |
|---|---|---|---|
| CN | 103682295 | * | 3/2014 |
| CN | 103682332 | | 3/2014 |
| CN | 103915605 | | 7/2014 |
| CN | 103915621 | | 7/2014 |
| CN | 103915622 | | 7/2014 |

* cited by examiner

SULFUR-BASED TRANSITION METAL COMPOSITE AND THE NEGATIVE ELECTRODE COMPRISING THE SAME AND THE BATTERY COMPRISING THE SAME

CROSS-REFERENCE TO RELATED APPLICATIONS

The present application is a 35 U.S.C. Section 371 national stage filing of International Patent Application No. PCT/CN2014/075762, filed 21 Apr. 2014, the disclosure of which is incorporated herein by reference in its entirety.

FIELD OF THE INVENTION

The present invention relates generally to the field of electrochemical energy storage devices, and more specifically, to a kind of negative electrode for lithium-ion batteries, and corresponding a negative electrode containing the claimed negative electrode active material, as well as high performance lithium-ion batteries using the claimed negative electrode active material.

BACKGROUND OF THE INVENTION

As a high efficiency and high energy density electrical energy storage device, lithium-ion secondary batteries have been widely used for portable electronic devices. Like other battery systems, lithium-ion batteries are mainly composed of a positive electrode, a negative electrode, a separator, and electrolytes. The performances of lithium-ion batteries are closely linked to the properties of those positive and negative electrode materials. At present, the positive electrode materials widely used in lithium-ion batteries are $Li^+$ intercalation-deintercalation transition metal oxides, such as layer metal oxides ($LiCoO_2$, $LiMn_{1/3}Co_{1/3}Ni_{1/3}O_2$, etc.), spinel metal oxides ($LiMn_2O_4$), olive metal oxides ($LiFePO_4$); the negative electrode materials widely used in lithium-ion batteries are $Li^+$ intercalation-deintercalation compounds, such as graphite. Thanks to these high performance materials, lithium-ion secondary batteries have become indispensable in such devices as cellular phones and laptop computers, etc. However, it is desirable to use batteries in applications requiring considerable power, and much effort has been expended in developing batteries suitable for high specific energy, medium power applications, such as, for electric vehicles and load leveling.

Elemental sulfur, used as the positive electrode material for batteries, has many attractive features, such as high energy density, natural abundance, low cost and environmental friendliness. Sulfur is considered as a very optimal positive electrode candidate for next generation lithium batteries because of its high theoretical specific capacity (1675 mAh $g^{-1}$). If the metal lithium is used as the negative electrode (theoretical specific capacity 3860 mAh $g^{-1}$), the formed lithium sulfur (Li—S) batteries has theoretical specific energy up to 2680 Wh $Kg^{-1}$, which is an optimal high energy density battery. However, the development of Li—S batteries is impeded by its disadvantages, such as sulfur and its discharge products have low electronic and ion conductivity, and the polysulfides produced in the process of discharge are prone to dissolve into organic electrolytes. Those disadvantages result in the poor rate performances, low active material utilization and rapid capacity decline. (References: 1) P. G. Bruce, S. A. Freunberger, L. J. Hardwick, and J-M. Tarascon, Nat. Mater., 2012, 11,19; 2) A. Manthiram, Y.-Z. Fu, and Y.-S. Su., Acc. Chem. Res., ASAP; 3) X. Ji, K. T. Lee, and L. F. Nazar, Nat. Mater., 2009, 8, 500).

In order to improve the cycling performance of Li—S batteries, varies of approaches have been proposed, such as the American patent publication No. 7250233 and No. 7078124. Though those methods could partly improve the performances of lithium-ion batteries, practical application effects are not obvious. The inventor of this invention once confined sulfur on the skeleton of C—C in an organic molecule (Japanese patent publication No. 3871306, No. 4208451, No. 4297673, No. 4674883 and American patent publication No. 6709787), which shows a high effect on suppressing polysulfides dissolution. However, compared with elemental sulfur, the cost of this material is relatively high, and the capacity of battery declines.

SUMMARY OF THE INVENTION

One purpose of the present invention is to provide a new kind of sulfur-based transition metal composite for lithium ion batteries. This negative electrode active material has good conductivity, high sulfur utilization, and excellent cycle performances. In general, the sulfur-based transition metal composite of the present invention are used as the negative electrode materials for lithium-ion batteries.

Metal sulfides are considered as the candidate of the positive electrode materials for its high working voltage. Now, these materials can be used as the negative electrode materials for lithium-ion batteries, through choosing suitable transition metal with proper bond energy to lower the work voltage.

DESCRIPTION OF THE PREFERRED EMBODIMENTS

Figure 1:
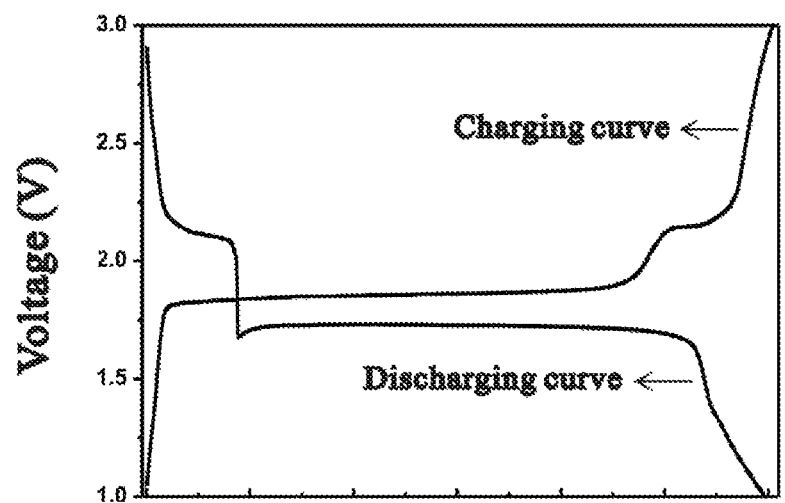
FIG. 1 is the charge and discharge curves of the negative electrode according to example 1.
Figure 2:
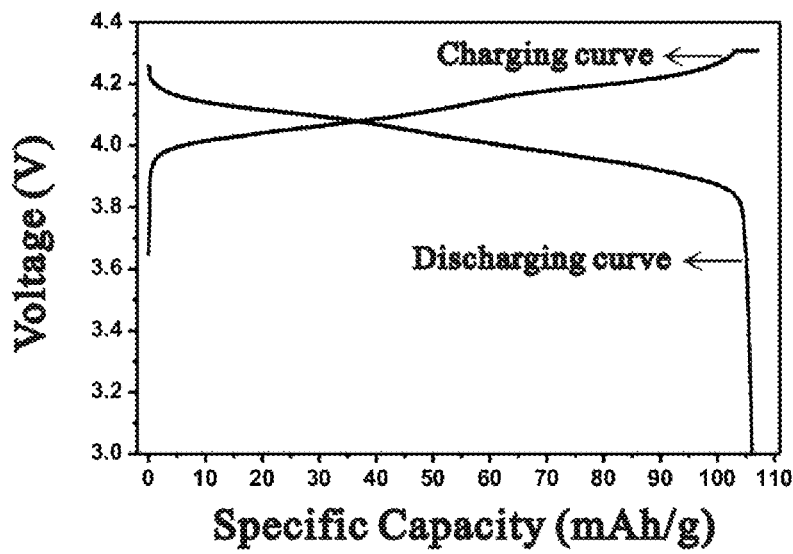
FIG. 2 is the charge and discharge curves of the positive electrode according to example 1.

The sulfur-based transition metal composite of the present invention can be classified into two types: one is the transition metal sulfides; another should include at least one kind of sulfur-based material and at least one kind of transition metal power. During the preparation process of this active negative electrode material and the charge/discharge cycles in a cell, where it is used as the active material, the metal sulfides could be formed through the reaction between sulfur-based material and the transition metal. The details described as follows.

The first type of sulfur-based transition metal composite is transition metal sulfides as the negative electrode active materials, which is metal various valence sulfides or more than two kinds mixture. The metal is chosen from at least one kind of the following metals, such as Cu, Ni, Co, Fe, Zn, Ti, Mo, V, etc. The typical transition metal sulfides are $M_xS$ ($1 \leq x \leq 2$) or $MS_x$ ($0.5 \leq x \leq 1$) (M=Cu, Ni, Co, Fe, Zn, Ti, Mo, V), such as CuS, $Cu_2S$, NiS, $MoS_2$, etc. For the consideration of the high capacity and low prices, the mass percentage of the transition metal sulfides in the negative electrode which is preferably more than 50%, more than 80% is more preferable. If the mass percentage is too low, the negative electrode will exhibit a low capacity.

There is no special requirement for the source of the transition metal sulfides in the present invention, which can be commercial products or in-situ prepared on the collector. The transition metal sulfides described in the present invention usually are powder particles. There is no special requirement for the size of particles, which only need to satisfy requirement of the design of electrode. Generally, the size of 0.1-20 μm is preferable, 1-10 μm is more preferable.

The other type of sulfur-based transition metal composite should include at least one kind of sulfur-based material and at least one kind of transition metal powders. During the preparation process of this active negative electrode material and the charge/discharge cycles in a cell, the metal sulfides could be synthesized through the reaction between sulfur-based material and the transition metals.

The sulfur-based materials described in the present invention are chosen from sulfur element ($S_8$), $Li_2S_n$ ($n \geq 1$), organic sulfides, and inorganic sulfides, containing one or more species. From the aspect of the high capacity and low price of the negative electrode, $S_8$ and $Li_2S_n$ ($n \geq 1$) are the best choice, with the content of the sulfur in the active materials from 10% to 80% (weight percentage). If the content is too low, the electrode would exhibit a low capacity, if the content is too high, the cycle performance will be lower.

The transition metal powders described in the present invention, are chosen from metallic powders or alloys from the following metal elements, such as Sc, Ti, V, Cr, Mn, Fe, Co, Ni, Cu, Zn, Y, Zr, Nb, Mo, Tc, Ru, Rh, Pd, Ag, Cd, Ta, W, Re, Os, Ir, Pt, and Au, furthermore, including partial oxidation or sulfuration products. Cu, Ni, Co, Mo, and Ti, etc. are the more preferable elemental metal powders. The micro-size particles are more preferable, and the nano-size one is the most preferable. There will be a chemical reaction between the elemental metal powder mentioned above and sulfur, generating a high electric conductivity compound with stable cycle performance, stabilizing the elemental sulfur, thereby increasing the specific capacity of the material.

Another purpose of the present invention is to introduce a new kind of negative electrode material for lithium-ion batteries. The negative electrode material described in the present invention has the following characteristics, the composition contains:

At least one sulfur-based transition metal composite as the claimed negative electrode active material;

Appropriate amount of conductive agent and binder, such as polyvinylidene difluoride (PVDF) etc.

And conductive current collector.

The negative electrode described in the present invention can be fabricated by the following method. Appropriate amount of conductive agent and polyvinylidene difluoride (PVDF) or other binders are added into the negative electrode active material in the present invention. Then, N-methyl-2-pyrrolidone (NMP) is used to dissolve and disperse the mixture (paste, slurry, etc.). Afterward, the slurry is coated onto the single side or duplex sides of the conductive current collector, such as copper foil, or aluminum foil. After removing the solvent, the ribbon shaped film containing the negative electrode active material is obtained. However, the fabrication of the negative electrode is not limited to the method above.

The conductive agent described in the present invention can be chosen from one or more kinds of the following carbon materials, such as carbon black conductive agent (Acetylene Black, Super P, Super S, 350G, Carbon Fiber (VGCF), Carbon Nanotubes (CNTs), KetjenblackEC300, KetjenblackEC600JD, Carbon ECP, Carbon ECP600JD etc.), graphite conductive agent (KS-6, KS-15, SFG-6, SFG-15, etc.), Carbon Nanorods, Graphene, and so forth.

The role of the binder in the present invention is to bind the above the negative electrode active materials on the current collector, as well as enhance the mechanical integrity of the negative electrode, improve the physical electrical contact of solid-solid interface or solid-liquid surface, increase the electronic and ionic conductivity of the entire electrode. Both aqueous-based and oil-based binder can be chosen. The binder in the present invention is chosen from the one or several kinds of following polymers, including Polyvinylidene Difluoride (PVDF), Polyvinyl Alcohol (PVA), Polyvinyl Alcohol (PTFE), Carboxymethylcellulose Sodium (CMC), Polyolefins (PP, PE, etc.), Nitrile Butadiene Rubber (NBR), Polymerized Styrene Butadiene Rubber (SBR), Polyacrylonitrile (PAN), and so forth.

The conductive current collector described in the present invention only needs to be conductive, normally metal conductive materials. There is no particular limitation. According to the implement plan in the present invention, the collector is conductive metal material or metal alloy, which contains one kind of metals or more, such as Al, Fe, Co, Ni, Cu, An, Ag, Pt, Au. From the aspect of cost and machinability, aluminum and copper foil are preferable.

The copper current collector described in the present invention is copper foil. There is no particular limitation for the thickness of collector and the material quality of the copper foil. There is no limitation for the thickness of copper foil, 1-30 μm is preferable, 5-15 μm is the most preferable. The material quality of copper foil can be pure copper or alloy copper. From the aspect of cost and machinability, the pure copper or the alloy copper containing more than 95% (weight percentage) of copper is preferable.

Another purpose of the present invention is to provide a particular battery that uses the above negative electrode active materials and the relevant electrodes as described previously. Apart from utilizing the negative electrode materials and the relevant electrodes as described previously, the batteries in the present invention also contain other necessary component, including the positive electrode, separators and non-aqueous electrolytes. Therefore, the non-aqueous electrolyte rechargeable batteries in this present invention need only the previous negative electrode active materials and relevant electrodes, while there is no extra limitation for other components, which can adopt the same composing items used in the current popular non-aqueous electrolyte rechargeable batteries.

Generally, the positive electrodes used in lithium-ion batteries can be used in the present invention. The positive electrode active materials involved in electrode have structures that allow reversible insertion and extraction (intercalation and deintercalation) of lithium ions, such as $Li_xMO_2$ or $Li_yM_2O_4$ (M=transition metal, $0 \leq x \leq 1$, $0 \leq y \leq 2$), spinel metal oxides, layered metal sulfides, olivine structured materials, and so forth.

As specific examples, lithium cobalt oxides (e.g., $LiCoO_2$), lithium manganese oxides (e.g., $LiMn_2O_4$), lithium nickel oxides (e.g., $LiNiO_2$), lithium titanium oxides (e.g., $Li_{4/3}Ti_{5/3}O_4$), lithium manganese nickel composite oxides, lithium manganese nickel cobalt composite oxides, olivine crystal structured materials as $LiMPO_4$ (M=Fe, Mn, Ni), and so forth.

Particularly, the lithium-containing composite oxides with layer structure or spinel oxides are preferable, such as $LiCoO_2$, lithium manganese nickel composite oxides (e.g., $LiMn_2O_4$, $LiNiO_2$, $LiNi_{1/2}Mn_{1/2}O_2$), lithium manganese nickel cobalt composite oxides (e.g., $LiNi_{1/3}Mn_{1/3}Co_{1/3}O_2$, $LiNi_{0.6}Mn_{0.2}Co_{0.2}O_2$), or $LiNi_{1-x-y-z}Co_xAl_yMg_zO_2$ ($0 \leq x \leq 1$, $0 \leq y \leq 0.1$, $0 \leq z \leq 0.1$, $0 \leq 1-x-y-z \leq 1$), and so forth. In addition, it also contains lithium-containing oxides that is formed from the above lithium-containing oxides by replacement of any element with addition element (e.g., Ge, Ti, Zr, Mg, Al, Mo, Sn, etc.).

These positive electrode active materials can be used separately or used by mixing two or more components together. For instance, higher capacity and safety can be obtained by utilizing layer structured lithium-containing composite oxides and spinel structured lithium-containing composite oxides mixed together.

The positive electrode slurry can be prepared by adding a conductive agent (such as carbon black, acetylene black, etc.) and binder (PVDF, polyethylene oxide (PEO), etc.) into the positive electrode active materials above. The slurry is coated onto ribbon shaped aluminum foil current collector to be operated as the positive electrode. However, the preparation method of the positive electrode is not limited to it.

In claimed non-aqueous electrolyte rechargeable batteries, there is no particular limitation for the separator that is used to separate the positive and negative electrode. Therefore, all kinds of separators used in the current popular non-aqueous electrolyte rechargeable batteries can be adopted.

The role of separator is to separate the positive electrode and negative electrode, and to avoid any electron stream past between the positive and negative electrodes directly, thus avoiding short circuit. The resistance should be as small as possible when the ion past, so porous polymer films are normally used, such as polyolefin resins (e.g., polyethylene, polypropylene), or polyester resins (polybutylene terephthalate). Small pore separators formed from polyester resins are preferable. In addition, those small pore separators (small pore films) can be used as a stack. The above polymer micro pore film can be modified by surface modification. For example, polyolefin composite ceramic separators coated with ceramic powder ($Al_2O_3$, $SiO_2$, etc.) can also be used.

There is no limitation to the thickness of the separators. But considering the aspect of safety and high energy density of the batteries, the thickness between 5 µm and 30 µm is optimal. In addition, there is no limitation for the air permeability (s/100 mL) of the separators, 10-1000 (s/100 mL) is preferable, 50-800 (s/100 mL) is more preferable, and 90-700 (s/100 mL) is the most preferable.

In the non-aqueous secondary battery of this present invention, the non-aqueous solvent (organic solvent) is used for the non-aqueous electrolytes, among which, the non-aqueous solvent with high dielectric constants is preferable. Because of low solubility of sulfides (especially the inductor of elemental sulfur) in carbonate type electrolytes, they are difficult to be charged and discharged in this type of solvents. So ethers type solvents like $R(CH_2CH_2O)_n$—R' (n=1-6, R and R' for methyl or ethyl, etc.) are preferably used, especially tetraethylene glycol dimethyl ether (TEGDME), ethylene glycol dimethyl ether (DME) and 1,3-2 oxygen pentane (DOL) et al. Sulfides have high solubility and stability in these ether-based electrolytes.

In addition, electrolytes containing a few amount of carbonate type solvent are feasible. Among them, it is recommended to use esters with high dielectric constants (a dielectric constant of 30 or more) such as ethylene carbonate, propylene carbonate, butene carbonate, γ-butyrolactone, sulphur-based esters (ethylene glycol sulfite or the like). Among them, the cyclic esters (ethylene carbonate, vinylene carbonate, propylene carbonate or butylene carbonate or the like) are especially preferred. Besides these, polar chain carbonates with the low viscosity and the polarity, branch chain aliphatic carbonates can be used, which are typified by dimethyl carbonate, diethyl carbonate, methyl ethyl carbonate. The mixture of cyclic carbonate (especially ethylene carbonate) and chain carbonate solvents are more preferable.

In addition to the above non-aqueous solvents, it can be adapted using chain alkyl esters such as methyl propionate, chain phosphate esters like trimethyl phosphate, nitrile solvents such as 3-methoxypropionitrile and the branch chain type compounds with ether bonds represented by dendritic-structured compounds.

Alternatively, the fluorinated solvents are also adapted.

Examples of the fluorine type solvents include a straight-chain alkyl ether such as $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$, $CF_3CHFCF_2OCH_3$, $CF_3CHFCF_2OCH_2CH_3$ etc. Namely, it also includes 2-trifluoromethyl hexafluoropropyl methyl ether, 2-trifluoromethyl hexafluoropropyl ethyl ether, 2-trifluoromethyl hexafluoropropyl propyl ether, 3-trifluoromethyl octafluorobutyl methyl ether, 3-trifluoromethyl octafluorobutyl ethyl ether, 3-trifluoromethyl octofluorobutyl propyl ether, 4-trifluoromethyl decafluoropentyl methyl ether, 4-trifluoromethyl decafluoropentyl ethyl ether, 4-trifluoromethyl decafluoropentyl propyl ether, 5-trifluoromethyl dodecafluorohexyl methyl ether, 5-trifluoromethyl dodecafluorohexyl ethyl ether, 5-trifluoromethyl dodecafluorohexyl propyl ether, 6-trifluoromethyl tetradecaheptyl methyl ether, 6-trifluoromethyl tetradecaheptyl ethyl ether, 6-trifluoromethyl tetradecaheptyl propyl ether, 7-trifluoromethyl hexadecaoctyl methyl ether, 7-trifluoromethyl hexadecaoctyl ethyl ether, 7-trifluoromethyl hexadecaoctyl propyl ether, etc.

In addition, the isoalkyl (perfluorinated alkyl) ethers and the straight-chain (perfluoroalkyl) alkyl ethers also can be used.

As lithium salts used in the nonaqueous electrolytes, lithium perchlorate, an organic lithium boron, and a lithium salt being a fluorine compound, or a lithium imide salt etc. are preferred.

For example, $LiClO_4$, $LiPF_6$, $LiBF_4$, $LiAsF_6$, $LiSbF_6$, $LiCF_3SO_3$, $LiCF_3CO_2$, $LiC_2F_4(SO_3)_2$, $LiN(C_2F_5SO_2)_2$, $LiC(CF_3SO_2)_3$, $LiCnF_{2n+1}SO_3$ (n≥2), $LiN(RfOSO_2)_2$ (where Rf represents fluoroalkyl) and the like are listed. Among these, the fluorine-containing organic lithium salts are especially preferred. Organic fluorine-containing lithium salts are easy to dissolve in non-aqueous electrolytes because the salt is very anionic and feasibly separated into ions.

The concentration of lithium salts in the non-aqueous electrolytes is preferred 0.3 mol/L or more, more preferably 0.7 mol/L or less, and is also 1.7 mol/L or less, more preferably 1.2 mol/L or less. When the concentration of lithium salts is too low, the ionic conductivity is decreased, if, too high, electrolyte salts may be precipitated.

In addition, various kinds of additives can also be added to the non-aqueous electrolytes to improve the performances of batteries. The additive is not limited to a specific one.

For example, adding the compounds with intramolecular unsaturated C=C bond into the non-aqueous electrolytes may suppress the deterioration of the cycle performance of batteries.

As compounds with intramolecular unsaturated C=C bond, examples are aromatic compounds like $C_6H_5C_6H_{11}$ (cyclohexylbenzene) and the like fluorinated aliphatic compounds like $H(CF_2)_4CH_2OOCCH=CH_2$, $F(CF_2)_8CH_2CH_2OOCCH=CH_2$ and aromatic compounds containing fluorine and the like. In addition, take the 1,3-propane sultone and 1,2-propylene glycol ester sulfate as the principal thing, compounds containing sulfur (for example, chain or cyclic sulfonate, chain or cyclic sulfate and the like) also can be used. Besides, vinylidene carbonate, vinyl ethylene carbonate, fluorinated ethylene carbonate, etc can be utilized, sometimes the effect on improving electrochemical performances is obvious. Especially when high crystalline carbon is used as the negative electrode active material, the combination use with vinylidene carbonate, vinyl ethylene carbonate and fluorinated ethylene carbonate the like can show better effect. The amount of adding various additives is preferably in a range of 0.05 to 5 wt % by mass relative to the total amount of non-aqueous electrolyte solution.

The aforementioned vinylidene carbonate, vinyl ethylene carbonate, fluorinated ethylene carbonate can form a protective film on the negative electrode surface by charging the battery using the electrolytes containing the additive above. This film can suppress side reactions caused by the negative electrode active material and non-aqueous electrolytes, so that decomposition of the non-aqueous electrolytes have been prevented.

Further, to improve performances of batteries at high temperature, the anhydride also can be added into the non-aqueous electrolyte solution.

Anhydride, as the negative electrode surface modification agent related to the formation of the surface composite film on the negative electrode, improves the storage capability of batteries at high temperature. Besides, adding anhydride into electrolytes not only reduces water content in the non-aqueous electrolytes, thereby decreasing the amount of gas generated in batteries.

There is no limitation on anhydride adding to the non-aqueous electrolytes, it can be either at least one anhydride structure in a molecule, or compounds with a plurality of anhydride structures.

As specific examples of anhydride, examples are mellitic acid trianhydride, malonic anhydride, maleic anhydride, butyric anhydride, propionic anhydride, pulvinic anhydride, phthalonic anhydride, phthalic anhydride, pyromellitic anhydride, lactic anhydride, naphthalic anhydride, toluic anhydride, thiobenzoic anhydride, diphenyl anhydride, citraconic anhydride, diglycolamidic anhydride, acetic anhydride, succinic anhydride, cinnamic acid, glutaconic anhydride, pentene dianhydride, valeric anhydride, itaconic acid anhydride, isobutyric anhydride, isovaleric acid and benzoic acid anhydride, etc. These anhydrides can be used alone or in combination of two or more kinds. The adding amount of anhydride to the non-aqueous electrolytes is preferably 0.05-1 wt % by mass relative to the amount of the non-aqueous electrolyte solution.

The present invention provides the assembling method of the non-aqueous electrolyte secondary battery packs. For example, the separator is sandwiched between the positive and negative electrodes followed by winded and molded to form an electrode roll, which is attached to a metal can. The positive and negative electrodes are connected to positive and negative terminals of the can via a lead or like that. Furthermore, the non-aqueous electrolyte solution of the embodiment is injected into the jacket, which is then sealed, wherein the solution of the embodiment is produced.

As the package of batteries, those metallic rectangular or cylindrical cans or a laminate made by metal a layer and two or more other layers (aluminum), can be used.

There is no limitation with respect to the manufacturing method and the structure of the non-aqueous electrolytes secondary battery. It is preferable to set up an opening formation process for charging the battery after accommodating the positive electrode, the negative electrodes, the separator and the non-aqueous electrolytes in the can and before completely sealing the battery.

Thus, the gas generated in early stage of the charging process and residual water within the battery can be removed out.

There is no limitation with respect to remove the gas inside the battery after the above opening formation process, either naturally removal or vacuum removal is viable. In addition, before the battery is completely sealed, the battery can be molded by a pressing operation or like that.

The non-aqueous electrolyte secondary battery provided in the present invention, due to its high capacity and good battery characteristics, can be widely applied as secondary batteries not only in mobile information instruments such as mobile phones and laptops, but also in various devices like electric vehicles or hybrid electric cars.

After we have made great efforts to investigate, three achievements has been gained. The first contains sulfur-based transition metal composite as the negative electrode active material, the negative electrode containing the composite and the battery containing the negative electrode. A new type of Li—S battery can be assembled with transition metal sulfides as negative electrodes (normally, they were used as positive electrodes) and the battery owns the high capacity and cycling stability. Also, the lithium ion batteries assembled with the widely used positive electrodes, separators, non-aqueous electrolytes and the negative mentioned above exhibit excellent electrochemical performances. The aforementioned positive electrodes contain the insertion/deinsertion layer-structured lithium-contained transition metal oxides like LiCoO2, $LiNi_{1/3}Co_{1/3}Mn_{1/3}O_2$, spinel-structured lithium-contained transition metal oxides like $LiMn_2O_4$ and olivine-structured lithium-contained transition metal oxides like $LiFePO_4$. Owning to the traits of transition metal sulfides, the technical problems in Li—S batteries have been primarily solved. At the same time, the performances of Li—S batteries have greatly improved with outstanding cycle performances, which is comparable with currently used lithium ion batteries.

Based on above principle and our great efforts to investigate, the second achievement has been obtained, which contains the sulfur-based transition metal composite (sulfur-based material with addition of copper powder) as the negative electrode active material, the negative electrode containing the composite and the battery containing the negative electrode. Normally, the sulfur-based material like element sulfur has been regarded as the positive electrode active material in Li—S batteries. The sulfur-based material with addition of copper powder here is regarded as the negative electrode active material and it exhibits greatly improved cycling stability. Also, the lithium ion batteries assembled with the widely used positive electrodes, separators, non-aqueous electrolytes and the negative mentioned above exhibit excellent electrochemical performances. The aforementioned positive electrodes contain the insertion/deinsertion layer-structured lithium-contained transition metal oxides like LiCoO2, $LiNi_{1/3}Co_{1/3}Mn_{1/3}O_2$, spinel-structured lithium-contained transition metal oxides like $LiMn_2O_4$ and olivine-structured lithium-contained transition metal oxides like $LiFePO_4$.

According to the achievement, while adding transition metal powder like copper, element sulfur and powder will react with each other to form the new compound undissolving in electrolytes when the electrode being charged and discharged. The transition metal not only improves the utilization efficiency of active materials and sulfur-sulfur bond activity, but also fixes the sulfur species in electrodes. It radically solves the technical problem of Li—S batteries and substantially enhances the electrochemical performances of batteries. In the claimed electrodes or batteries, the utilization efficiency of element sulfur could nearly reach 100% and the capacity nearly reach the theoretical capacity of sulfur (1670 mAh/g), which is four times more than that of currently commercial graphite as the negative electrode active material for lithium ion batteries. Therefore, the announced achievement could provide the battery with marvelous cycling stability which could be comparable with its counterparts.

The discharge plateau of the claimed sulfur-based transition metal composite is about 1.7 V (v. s $Li^+/Li$). The relatively high discharge plateau could inhibit formation of lithium dendrite during charge/discharge processes in order to prevent short circuit in batteries. Compared with metal lithium or graphite with low discharge plateau, the claimed composite is safer. On the other hand, the claimed composite owns the high specific capacity which is ten times more than that of commercially used spinel-structured $Li_4Ti_5O_{12}$ (the discharge plateau: 1.5 V, the practical capacity: ~150 mAh/g). From this aspect, the claimed negative electrode or the claimed battery in the invention owns higher capacity and safety compared with those batteries with Ti-based materials as active material.

Like $Li_4Ti_5O_{12}$, the claimed sulfur-based transition metal composite negative electrode active material possesses many advantages such as flat charge/discharge platform and high cycling stability. Besides, the raw materials are cheap and the synthetic process is simple.

Herein below, the present invention will be illustrated in more detail with following examples. However, it should be pointed out that following examples and comparative examples, which are for illustrative purposes only, and should not be construed as limiting scope of the present invention.

Other purposes and advantages of the invention will be partially stated in the following description, part of which will be obvious from the description, or comprehended from the specific embodiments of this invention.

In the following description, the term "%" is based on the mass unless otherwise specified.

EXAMPLE 1

Preparation of the negative electrode: 70 g $Cu_2S$ (Aladdin™, 5 μm), 20 g conductive agent acetylene black were milled and mixed uniformly; 10% binder solution was prepared by dissolving binder PVDF in N-methyl-2-pyrrolidone (NMP). 90 mass parts of the negative active material powder and 100 mass parts of binder solution were mixed in NMP solvent and stirring for 1 hour or more to get the negative electrode slurry. The slurry was buttered onto 10 μm thick aluminum foil current collector, then dried in a vacuum oven at 60° C. for 12 hours to remove the solvent. Then the electrode was punched into 12 mm round dicks. The dicks were weighted and used as the negative electrode of the batteries. The discharge curve of half-cell is shown in FIG. 1.

Preparation of the positive electrode: 90 mass parts of spinel $LiMn_2O_4$ (positive active material, practical capacity is 106.3 mAh/g) was mixed with 5 mass parts of conductive carbon black, then 50 mass parts of PVDF binder solution along with the mixture were mixed in NMP solvent to get the positive material slurry. The slurry passed through a 70 mesh screen to remove large particles. The slurry was coated onto 15 μm thick aluminum foil current collector, dried in vacuum oven at 80° C. for 12 hours to remove the solvent. The electrode was punched into 12 mm round disks, weighed and operated as the positive electrode of the batteries.

Figure 3:
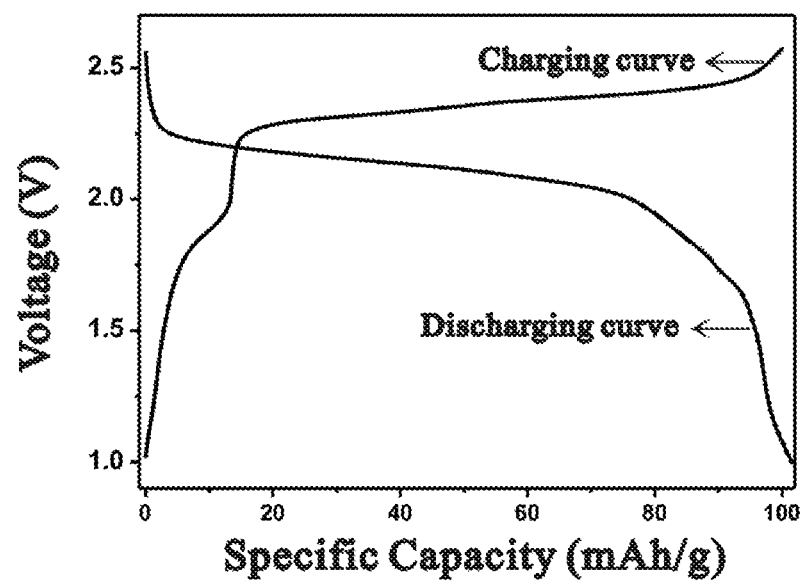
FIG. 3 is the charge and discharge curves of the $LiMn_2O_4$/$Cu_2S$ battery according to example 1.
Figure 4:
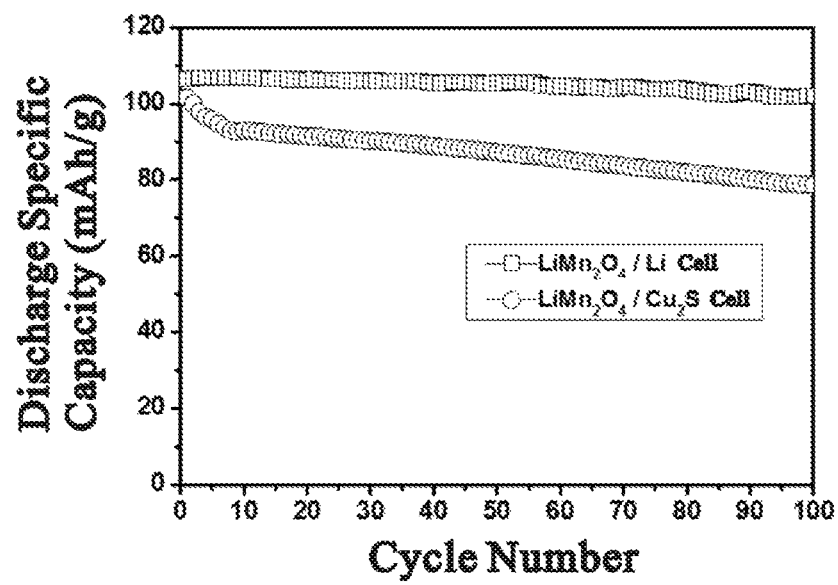
FIG. 4 is the comparison of the cycle performance between $LiMn_2O_4$/$Cu_2S$ and $LiMn_2O_4$/Li batteries.

Battery assembly: coin cells were assembled by using the negative electrode and the positive electrode prepared above. The batteries were assembled in the argon filled glove box by sequentially stacking the negative electrode, three-layer separator (PP/PE/PP), absorbent paper, the positive electrode and aluminum gasket together, the electrolyte was added into the batteries to get full coin batteries. The batteries were tested using a battery test system, test voltage ranges from 1.0-2.6 V. The discharge curve, cycle performance and the discharge capacity (due to the excess of the positive electrode material, it represents the negative electrode capacity) were shown in FIG. 3, FIG. 4 and Table 1.

The electrode capacity confirmation: a half coin battery was assembled using the electrode prepared, lithium foil (0.1 mm thick), electrolyte (1 M LiTFSI-DOL/DME (3:7 volume ratio)) and separator (PP/PE/PP) in argon filled glove box. Batteries were tested using the battery test system after standing overnight. For the negative electrode, the battery was discharged to 1.0 V at the current density of 0.5 $mA/cm^2$, charged to 3.0 V at 0.5 $mA/cm^2$; for the positive electrode, the battery was charged to 4.3 V at the current density of 0.5 $mA/cm^2$ and discharged to 3.0 V at 0.5 $mA/cm^2$.

Charge and discharge performances evaluation: the batteries were fully charged then discharged at constant current repeatedly at room temperature. Charge condition: charge the batteries to definite voltage at 0.5 C and keep charging at this voltage to reach a total of 2.5 hours (full charge), discharge condition: discharge the batteries to definite voltage at the rate of 1.0 C. The capacity retention ratio after 100 cycles refers to the ratio of the discharge capacity after 100 cycles divided by the initial discharge capacity.

EXAMPLE 2

Figure 5:
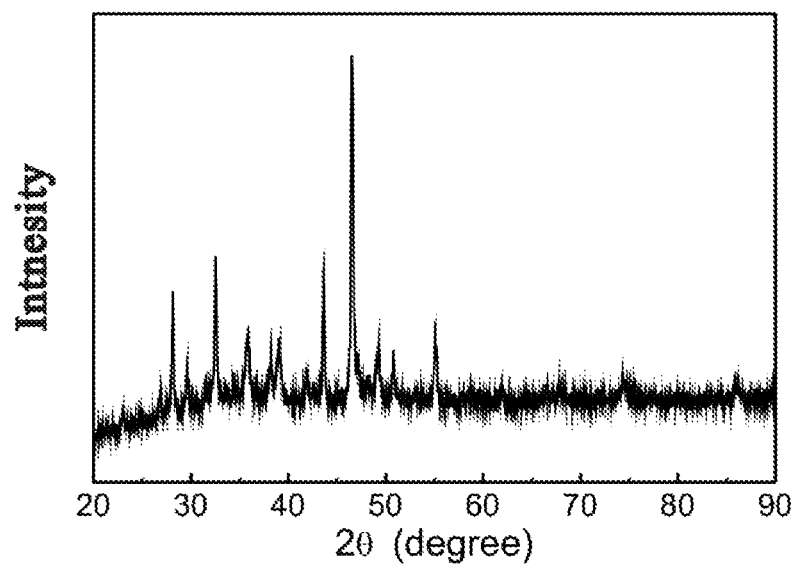
FIG. 5 is the XRD pattern of copper sulfide according to example 2.

Synthesis of $Cu_2S$: the stoichiometric copper and sulfur (molar ratio=2:1) were mixed together, added into heat resistant glass tube and sealed under high vacuum environment. The glass tube was heated to 400° C. by 3° C./min and kept at 400° C. for 3 hours, then cooled to room temperature by 5° C./min. The product was grinded after taking out. The element analysis results showed that the copper sulfide prepared is consisted of $Cu_{1.98}S$, whose XRD pattern is shown in FIG. 5.

The synthetic $Cu_{1.98}S$ was used as the negative electrode material. The battery assembly and evaluation were conducted the same as Example 1, whose evaluation results are shown in Table 1.

EXAMPLE 3-6 AND COMPARISON 1-3

Example 3-6 and comparison 1-3 were synthesized using the same method as Example 2. Different stoichiometry synthesized copper sulfide ($Cu_xS$) powder materials (Table 1) were used as negative electrode active materials. The batteries assembly and evaluation were conducted the same as Example 2, whose results are shown in Table 1.

TABLE 1

| Example | Negative electrode | Cell capacity (mAh/g) | Capacity retention (%) after 100 cycles |
|---|---|---|---|
| 1 | $Cu_2S$ (Aladin) | 101.6 | 77.5 |
| 2 | $Cu_{1.98}S$ | 102.6 | 76.1 |
| 3 | $Cu_{1.91}S$ | 98.8 | 75.4 |
| 4 | $Cu_{1.78}S$ | 101.7 | 75.8 |
| 5 | $Cu_{1.46}S$ | 101.5 | 69.7 |
| 6 | $Cu_{1.03}S$ | 100.8 | 52.6 |
| Comparative example 1 | $Cu_{0.95}S$ | 102.2 | 44.1 |
| Comparative example 2 | $Cu_{0.88}S$ | 99.7 | 36.8 |
| Comparative example 3 | $Cu_{0.5}S$ | 99.7 | 30.3 |

As can be seen, $Cu_xS$ powder material used as the negative electrode active material exhibits good electrochemical characteristics, utilization of the positive electrode active material is high. The molar ratio of copper and sulfur is represented as x. When x is in the range of 1.7-2.0, the capacity retention ratio after 100 cycles is more than 75%. When x is out of this range, the cycle characteristics of the battery is low. When x<1, the cycle performances deteriorate severely.

EXAMPLE 7

Following the same experimental conditions as in Example 1, except that nickel sulfide (NiS, Aladdin™) replaced copper sulfides used as the electrode material for further evaluation. Test results were as follow: the discharge capacity of $LiMn_2O_4$ in $LiMn_2O_4/NiS$ batteries was 100.9 mAh/g, the capacity retention ratio after 100 cycles was 60.2%. The results show that NiS can also be used as the negative electrode material of the battery system.

Although detailed description about this invention has been made with preferred embodiments, those skilled technicians in this field would comprehend that the present invention can be made into various modifications or replacement, without detaching from the scope of the appended patent claims or the equivalents where the ideas or scopes of the present invention have been mentioned.

EXAMPLE 8

Figure 6:
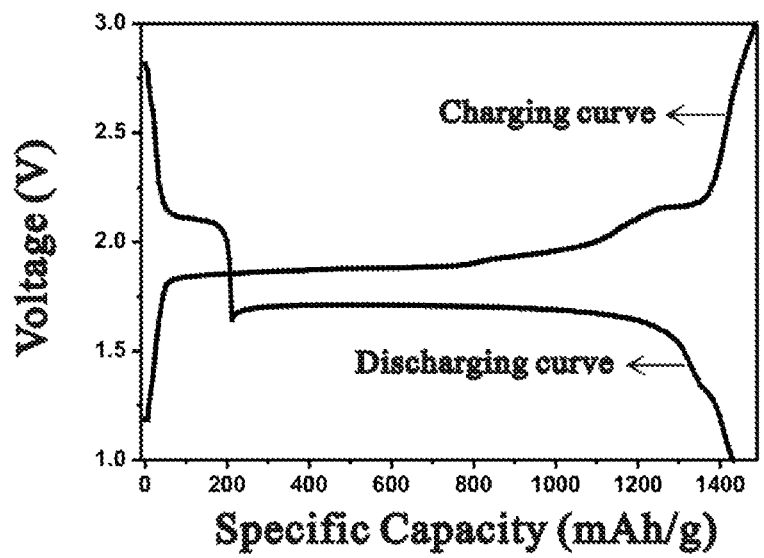
FIG. 6 is the charge and discharge curves of the negative electrode according to example 8.

Preparation of the negative electrode: 65 g sulfur powder, 30 g conductive agent acetylene black, 130 g electrolytic copper powder (Cu:S molar ratio=2:1) was milled together to make a mixture. The mixture was added into 100 g CMC water solution (2%), dispersed with NMP and distilled water (volume ratio of about 1:1) evenly. Then 7.5 g SBR latex binder (40%) was added and stirred for 1 h or more to prepare a slurry with certain viscosity. The negative electrode slurry was coated onto a 10 μm thick aluminum foil current collector, the aluminum foil was then placed into 60° C. vacuum oven for 12 h to remove the solvent. Then the foil was punched into 12 mm round disks, weighted and used as the negative electrode of the battery. The content of sulfur in the negative electrode is 1.4 mg, the discharge curve and the discharge capacity are shown in FIG. 6.

Figure 7:
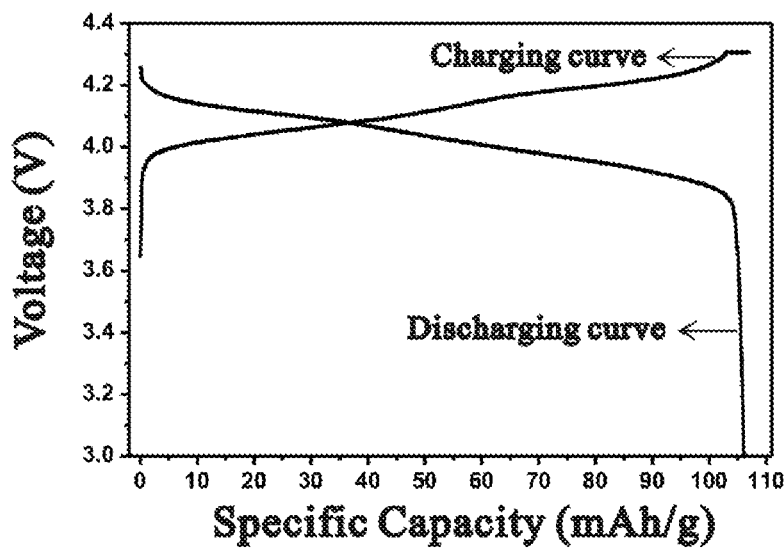
FIG. 7 is the charge and discharge curves of the positive electrode according to example 8.

Preparation of the positive electrode: 90 parts (by mass) spinel lithium manganese oxide ($LiMnO_2$, the positive electrode active material, the actual capacity is 106.3 mAh/g) and 5 parts conductive carbon black were mixed together. 5 parts PVDF (NMP solution) was added into the mixture to form the positive electrode slurry. The slurry was passed through a 70 mesh screen to remove large particles. The slurry was then uniformly coated on a 15 μm thick aluminum foil current collector, dried in 80° C. vacuum oven for 12 h. The foil was punched into 12 mm round disks, weighed and used as the positive electrode of the battery. Active material content ratio of the positive electrode to the negative electrode was 100:120 (the capacity of the negative electrode active material excesses the other). The discharge curve and discharge capacity are shown in FIG. 7.

Figure 8:
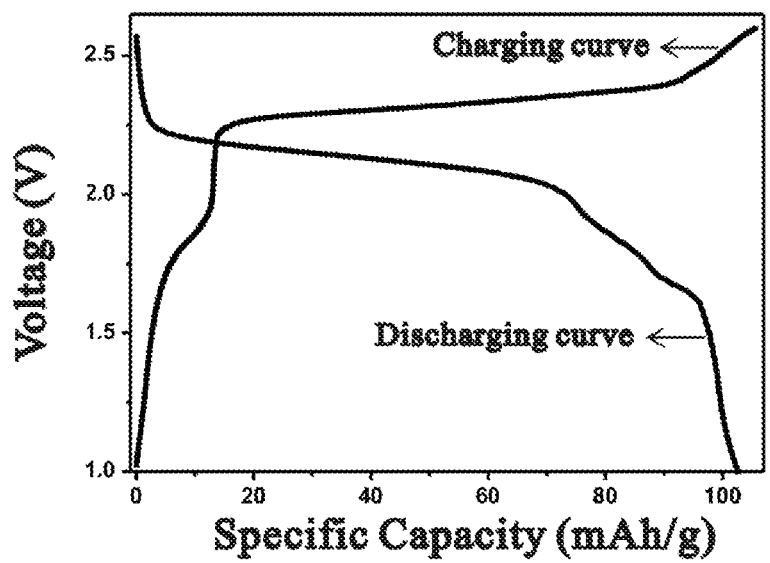
FIG. 8 is the charge and discharge curves of batteries according to example 8.

Batteries assembly: coin cells were assembled and evaluated by using sulfur negative electrodes and spinel lithium manganese oxide positive electrodes above. The battery was assembled in argon filled glove box, the negative electrode, three-layer porous separator (PP/PE/PP), absorbent paper, the positive electrode and aluminum gasket were placed together in order, the electrolyte was then added to form a full battery. The battery was tested using battery test system, the cut-off voltage is 1.0-2.6 V. The discharge curve and discharge capacity of the battery (due to the excess of the negative electrode active material, the battery capacity is determined by the positive electrode capacity) are shown in FIG. 8 and Table 2.

Electrode capacity confirmation: a half coin battery was assembled using the electrode prepared, lithium foil (0.1 mm thick), electrolyte (1 M LiTFSI-DOL/DME (3:7 volume ratio)) and separator (PP/PE/PP) in an argon filled glove box. Batteries were tested by the battery test system after placing overnight. For the negative electrode, the battery was discharged to 1.0 V at the current density of 0.5 mA/cm², charged to 3.0 V at 0.5 mA/cm²; for the positive electrode, the battery was charged to 4.3 V at the current density of 0.5 mA/cm² and discharged to 3.0 V at 0.5 mA/cm².

Battery charge and discharge performance evaluation: the batteries were charged at first, then discharged at constant current repeatedly at room temperature. Charge condition: charging the batteries to definite voltage at 0.5 C and keep charging at this voltage to reach a total of 2.5 h (fully charged). Discharge condition: discharging the batteries to definite voltage at the rate of 1.0 C. The capacity retention ratio after 100 cycles refers to the ratio of discharge capacity after 100 cycles divided by the initial discharge capacity.

COMPARISON 4

$LiMnO_2/S_8$ coin batteries were assembled the same as Example 8, while using the graphite as the negative electrode active material instead of copper powder. The test results are shown in Table 2.

EXAMPLE 9

$LiNi_{1/3}Co_{1/3}M_{1/3}O_2/Cu-S_8$ coin batteries were assembled and tested the same as Example 8 while using the $LiNi_{1/3}Co_{1/3}Mn_{1/3}O_2$ as the positive electrode active material instead of spinel $LiMn_2O_4$. The test results are shown in Table 2. The cut-off voltage ranges from 1.0 V to 2.6 V.

FIGS. 6-9 show the discharge curves of the negative electrode, the positive electrode and full batteries in Example 8. As can be seen from FIG. 6, the discharge platform of the negative electrode is around 1.7 V, the discharge capacity of sulfur is up to 1477 mAh/g, close to the theoretical capacity of sulfur. The discharge capacity of sulfur in Comparison 4 is 262 mAh/g. It means the simply mixture of copper and sulfur increases the utilization of sulfur. FIG. 8 can be seen as a simple superposition of FIG. 6 and FIG. 7. The median value of the discharge curve is 2.09 V, the discharge capacity is 101.3 mAh/g, consistent with the capacity of the positive electrode which means the capacity of the positive electrode was fully released with $Cu-S_8$ as the negative electrode and its reversible capacity is lower than that of the positive electrode material. The capacity of $LiNi_{1/3}Co_{1/3}Mn_{1/3}O_2$ electrode in Example 9 (shown in Table 2) is 142.1 mAh/g, which is close to its actual capacity of 147.0 mAh/g. It means the capacity of the positive electrode was fully released with $Cu-S_8$ as the negative electrode and its reversible capacity is lower than that of positive electrode material.

TABLE 2

| Example | Positive electrode | Component of negative electrode (atomic ratio) | | Cell capacity (mAh/g) (negative electrode capacity) | Capacity retention after 100 cycles (%) |
| --- | --- | --- | --- | --- | --- |
| | | Sulfur | Copper powder | | |
| 8 | Lithium manganate | 1 | 2 | 101.2 | 95.5 |
| 9 | $LiNi_{1/3}Co_{1/3}Mn_{1/3}O_2$ | 1 | 2 | 142.1 | 94.9 |
| Comparative example 4 | Lithium manganate | 1 | 0 | 106.3 | 21.1 |

Figure 9:
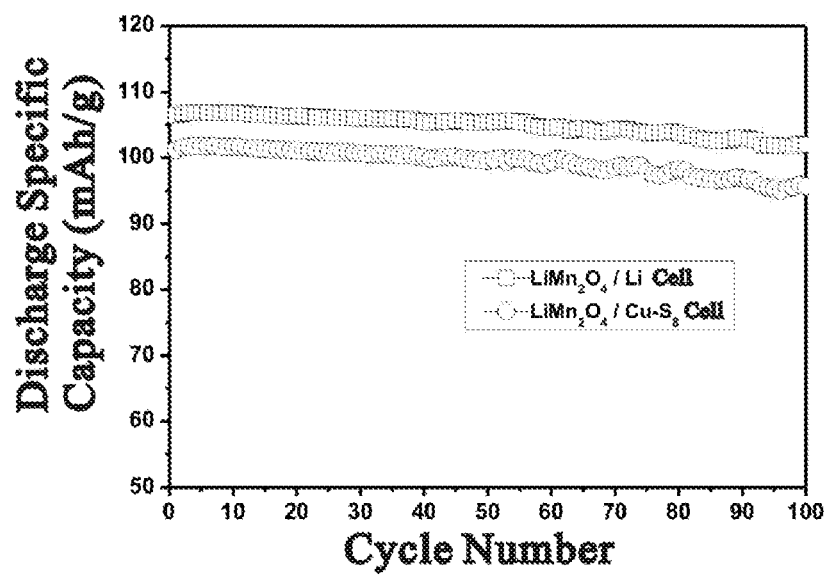
FIG. 9 is the comparison of the cycle performance between $LiMn_2O_4$/Cu—$S_8$ and $LiMn_2O_4$/Li batteries.

FIG. 9 is a comparison between $LiMn_2O_4/Li$ and $LiMn_2O_4/Cu-S_8$ batteries. It can be seen that the cycle characteristics of $LiMn_2O_4/Cu-S_8$ and $LiMn_2O_4/Li$ batteries are basically the same. The retention is more than 95% after 30 cycles, indicating that $Cu-S_8$ negative electrode shows good cycle characteristics.

EXAMPLE 10-14

In the preparation of the negative electrode in Example 8, copper powder was replaced by other metal powder. $LiMn_2O_4/M-S_8$ (M=metal) coin batteries in Example 10-14 were assembled and tested the same as Example 8. The test results are shown in Table 3.

It is obvious that when copper, nickel, cobalt, molybdenum, titanium and other transition metal powder or its partly oxidation/sulfuration composite was mixed with sulfur, the utilization of sulfur and cycle characteristics of battery can be improved.

TABLE 3

| Example | Positive electrode | Negative electrode capacity (mAh/g) (calculated as mass of sulfur) | Cell capacity (mAh/g) | Capacity retention after 100 cycles (%) |
| --- | --- | --- | --- | --- |
| 10 | Nickle | 1425 | 102.1 | 92.3 |
| 11 | Molybdenum | 1452 | 98.8 | 90.5 |
| 12 | Titanium | 1489 | 99.7 | 89.7 |
| 13 | Copper with some oxidized (oxygen content = 8 wt %) | 1621 | 100.3 | 94.3 |
| 14 | Copper with some sulfidated (sulfur content = 10 wt %) | 1567 | 100.8 | 95.2 |

EXAMPLE 15

24 g $Na_2S$ was dissolved in 50 mL ethanol/water (1:1 v/v), 10.8 g sulfur powder was added. The mixture reacted for 1 h at room temperature. The solvent was removed by using rotary evaporation apparatus, and then 150 mL DMF (dimethylformamide) was added followed by stirring. Then 8.61 g 1,3-hexachlorobutadiene was slowly dropped into the solution and stirred for 1 hour at room temperature. 300 mL water was added to precipitate the product. The precipitation was washed with water, acetone and methanol. After dried at 40° C., brown solid carbon sulfur compound $((CS_{3.5})_n)$ was obtained.

The preparation of negative electrodes is the same as Example 1 except using $(CS_{3.5})_n$ (the weight ratio of $(CS_{3.5})_n$ to Cu is 1:2) as the active material instead of sulfur powder. $LiMn_2O_4/Cu-(CS_{3.5})_n$ coin batteries were assembled and tested as the same as Example 1. The results are shown in Table 4.

EXAMPLE 16-17 AND COMPARISON 5

In the preparation of the negative electrode in example 15, $(CS_{3.5})_n$ was replaced by $(CS_x)_n$ as the active material. $LiMn_2O_4/Cu-(CS_x)_n$ batteries were assembled the same as Example 15. The results are displayed in Table 4.

The preparation of negative electrodes in Comparison 5 is the same as Example 15 except that copper powder wasn't added into the electrodes. The results are shown in Table 4.

It can be inferred from Table 4 that the addition of copper powder greatly improved the utilization of carbon sulfur compounds as well as the cycle characteristics of the batteries.

TABLE 4

| Example | Negative electrode | Negative electrode capacity (mAh/g) (calculated as mass of sulfur) | Cell capacity (mAh/g) | Capacity retention after 100 cycles (%) |
| --- | --- | --- | --- | --- |
| 15 | Copper powder-$(CS_{3.5})_n$ | 1025 | 102.1 | 93.1 |
| 16 | Copper powder-$(CS_{4.7})_n$ | 1258 | 98.8 | 93.4 |
| 17 | Copper powder-$(CS_{6.2})_n$ | 1367 | 99.7 | 92.8 |

TABLE 4-continued

| Example | Negative electrode | Negative electrode capacity (mAh/g) (calculated as mass of sulfur) | Cell capacity (mAh/g) | Capacity retention after 100 cycles (%) |
|---|---|---|---|---|
| Comparative example 5 | $(CS_{3.5})_n$ (without copper powder) | 830 | 78.2 | 53 |

Exemplary embodiments of the present invention are described above. However, conditions and embodiments described in the examples are considered as illustrative to confirm enablement and the present invention is not restricted to these conditions. The invention can be applied in other various conditions without departing from the gist of the invention for accomplishing the target of this invention. The scope of the present invention should be constructed based on the claims. Applicants don't disclaim any embodiment encompassed by the claims and any equivalents.

We claim:

1. A battery comprising a positive electrode, a porous separator, non-aqueous electrolytes, and a negative electrode having a negative electrode active material comprising at least one kind of monometallic sulfur-based material and at least one kind of transition metal powder, wherein the monometallic sulfur-based material is selected from the group consisting of $Li_2S_n$ (where n≥1), organic sulfides, and inorganic sulfides, and combinations thereof, and wherein the at least one kind of monometallic sulfur-based material and the at least one kind of transition metal powder constitute the majority of the negative electrode active material, by weight percent.

2. The battery of claim 1, wherein the positive electrode contains at least one kind of layer-structured, lithium-containing transition metal oxides, or at least one kind of spinel-structured, lithium-containing transition metal oxides, or at least one kind of olivine-structured, lithium-containing transition metal oxides.

3. The battery of claim 1, wherein the formula of the non-aqueous electrolyte solvent is $R(CH_2CH_2O)_n$—R') polyether, where n=1 to 6, R is a methyl or ethyl group, and R' is a methyl or ethyl group.

4. The battery of claim 1, wherein the negative electrode further comprises a current collector, a conductive agent, and a binder.

5. The battery of claim 4, wherein the current collector is copper foil.

6. The battery of claim 5, wherein the thickness of the copper foil is in a range of from 1 μm to 30 μm.

7. The battery of claim 5, wherein the thickness of the copper foil is in a range of from 5 μm to 15 μm.

8. The battery of claim 1, wherein the transition metal powder is selected from the group consisting of elemental powders of Sc, Ti, V, Cr, Mn, Fe, Co, Ni, Cu, Zn, Y, Zr, Nb, Mo, Tc, Ru, Rh, Pd, Ag, Cd, Ta, W, Re, Os, Ir, Pt, and Au or combinations thereof, and their (metal or alloy powders) partially oxidated or sulfidated compounds.

9. The battery of claim 1, wherein the negative electrode active material contains copper powder.

10. The battery of claim 1, wherein the negative electrode active material contains sulfur/carbon compounds and copper powder.

11. The battery of claim 1, wherein the negative electrode active material contains $Li_2S_n$ (n≥8) and copper powder.

12. The battery of claim 1, wherein a molar amount of the at least one kind of transition metal powder in the negative electrode active material is in excess of a molar amount of the monometallic sulfur-based material in the negative electrode active material.

13. The battery of claim 12, wherein the at least one kind of transition metal powder and the monometallic sulfur-based material are present in a molar ratio of 2:1.

* * * * *